A. C. ROEBUCK.
LINK CONNECTION.
APPLICATION FILED MAR. 13, 1914.
1,217,640.
Patented Feb. 27, 1917.
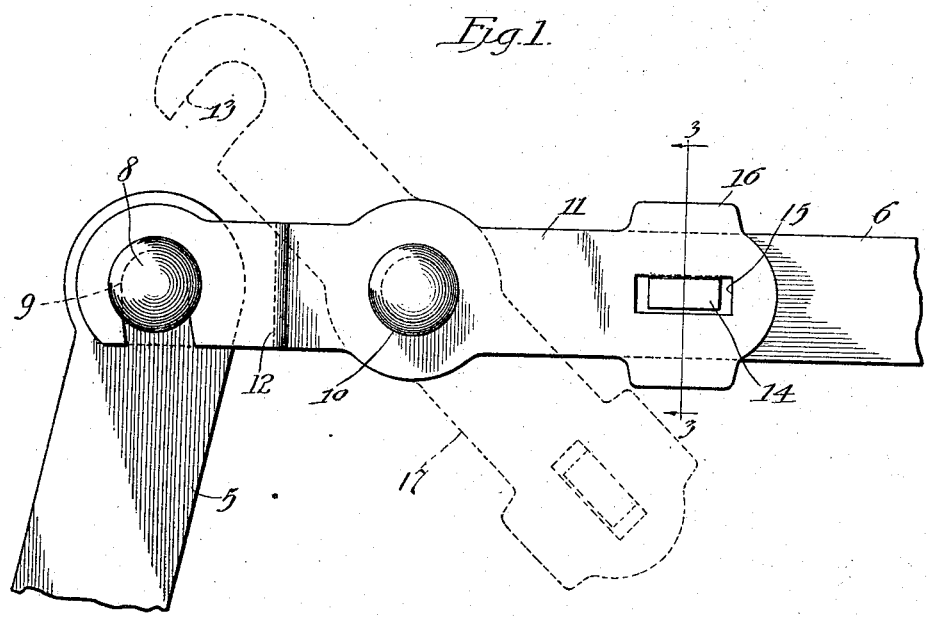
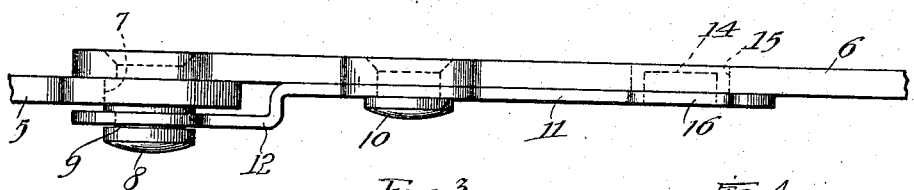
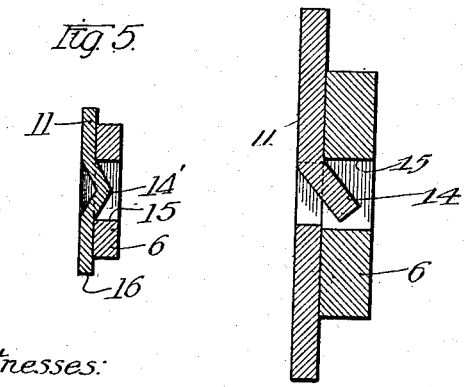
Witnesses:
Inventor:
Alvah C. Roebuck,
by Brown Nissen & Sprinkle
Attys.

UNITED STATES PATENT OFFICE.

ALVAH C. ROEBUCK, OF WOODSTOCK, ILLINOIS, ASSIGNOR TO WOODSTOCK TYPEWRITER COMPANY, OF WOODSTOCK, ILLINOIS, A CORPORATION OF ILLINOIS.

LINK CONNECTION.

1,217,640.     Specification of Letters Patent.     Patented Feb. 27, 1917.

Application filed March 13, 1914. Serial No. 824,582.

*To all whom it may concern:*

Be it known that I, ALVAH C. ROEBUCK, a citizen of the United States, residing at Woodstock, in the county of McHenry and State of Illinois, have invented certain new and useful Improvements in Link Connections, of which the following is a specification.

This invention relates to the connection of links pivoted with respect to each other, and is more particularly described as a double locking link connection. The principal object of the invention is to provide a double locking link connection by means of which two links may be pivotally connected together and locked in pivotal engagement against accidental release or displacement.

A further object of the invention is to provide a spring engaged pivotal connection which must be released manually by releasing a catch from a slot in one of the links in order to disengage the spring.

For the attainment of these ends and the accomplishment of other new and useful objects, as will appear, the invention consists in the features of novelty in the construction, combination and arrangement of the several parts generally shown in the accompanying drawings and described in the specification, but more particularly pointed out in the appended claims.

In the drawings, Figure 1 is a side elevation of a pair of links pivoted to each other by a connection constructed in accordance with the principles of my invention; Fig. 2 is a view looking at the edge of the links; Fig. 3 is a detail sectional view on the line 3—3 of Fig. 1; Fig. 4 shows a modified form of catch; and Fig. 5 shows a modified form of lock.

Although this invention may have a general application to the connection of two links, levers or other similar members, it is particularly adapted for use in connection with links and levers which are made of thin sheet metal construction, such for example as typewriter key-levers and connecting links. The construction is particularly well adapted for use where it is desirable to provide a connection which may be readily engaged and disengaged, but which, when it is in engaging position, is not subject to disengagement except by manual attention thereto.

In the present exemplification of the invention, the numerals 5 and 6 designate generally members or links which are to be connected by this improved form of connection. One of the links 5 is provided with a perforation 7 and the other member 6 is provided with a stud 8 secured thereto adapted to be inserted through and beyond the perforation 7 of the other member 5 with a groove 9 adjacent the end of the stud and beyond the member 5. Pivoted to the lever 6 by means of a pivot pin 10, is a lever 11, one end of which is formed with an offset portion 12 formed with a hook 13, the hook being adapted to engage in the groove 9 of the stud 8 when the lever 11 is parallel with the member 6. Adjacent the other end of the lever 11 it is formed with a tongue 14 bent out of the plane of the lever itself in the direction of the member 6, and the member 6 is provided with a recess or slot 15 in which the tongue 14 is adapted to engage, when the lever 11 is rotated to a position parallel or substantially parallel with the member 6. This lever 11 is preferably constructed of resilient material substantially of the same width as the member 6 with lateral projecting portions 16 at the edges opposite the tongue 14 so that this end of the spring lever can be raised to clear the tongue 14 from its engagement with the slot 15 of the member 6 whereby the lever 11 may be rotated to the dotted position 17 to clear the hook 13 from engagement with the groove 9 of the stud 8. The stud may thereupon be pressed out of the hole 7 in the member 5 and the links are thereupon disengaged.

It is obvious that the links or members 5 and 6 are connected not only by means of the engagement of the hook 13 with the stud 8 which passes through one of the links, but a spring lock is provided for the lever 11 which prevents the disengagement of the lever from the stud unless the lever is manually disengaged from the member 6 to which it is pivoted. It is also obvious that the tongue and slot connection between the lever and the link to which it is connected may be reversed and will produce the same result. The lever 11 may be rotated from a disengaging position to a position engaging the stud without manually raising the end of the lever since the natural resiliency of the material of which the lever is constructed will cause the tongue to separate the end of the lever from the member to which it is connected until the tongue registers with the slot in the member, whereby it will remain locked until disengagement, as previously set forth.

Instead of having a hook the lever may be formed with an offset portion 12', the end of which engages the groove in the stud as shown by Fig. 4, and instead of a distinct tongue of metal, the locking device may consist of a projection 14' which is engaged by the perforation 15 of the member 6, as shown by Fig. 5. Other modifications may also be adopted within the scope of the following claims, and I desire, therefore, not to be limited to the exact construction illustrated.

What I claim is:

1. The combination, with a member provided at one end with a stud, of another member provided at one end with a perforation to fit the stud closely, and a locking lever pivoted intermediate its ends to the studded member and of substantially the same width as the studded member, with a hook at one end to engage over the stud and with a finger-graspable portion at the other end which extends beyond the member to which it is attached on either side when the hook is in engagement with the stud.

2. The combination with a pair of members, one having a stud at its end and the other having a perforation to fit over the stud, of a locking member pivoted intermediate its ends adjacent the end of the studded member, the studded member being formed with a recess at a distance from its end, the said lever being formed at one end to engage the end of the stud and at the other end with a locking tongue to engage the said recess of the studded member.

3. The combination with a pair of links, one provided with a stud at one end and the other provided with a perforation to fit the stud, and a locking lever pivoted intermediate its ends to the studded member having a hook at one end to engage the outer end of the stud, the said studded member being formed with a recess, the locking lever being formed with a coöperating tongue at the end opposite the hook to engage the recess, the locking lever being of substantially the same width as the studded member to which it is pivoted, except at the end adjacent the tongue, where it has lateral projections to constitute a lifting means on each side of the studded member for disengaging the tongue from the recess in order to disengage the hook of the lever from the stud.

4. The combination with a pair of link members to be connected, one formed at one end with a stud having a notch at its outer end, the other formed with a perforation to fit over the stud, and a locking lever of substantially the same width as the studded member pivoted intermediate its ends adjacent the stud of the said studded member, the locking lever having an offset hooked portion to engage the notch of the stud and having at the other end an engaging tongue and lateral extensions on both sides, the said studded member having a recess for engaging the tongue which may be disengaged by raising its end of the lever by means of the laterally extending portions.

5. In combination, a pair of links one being provided with a perforation at its end, a stud connected to the end of the other link adapted to project through and fit the perforation of the other member and having a groove in the projecting end, a resilient lever pivotally connected intermediate its ends to and substantially as wide as the studded link, formed at one end with an offset portion in which is a hook adapted to engage with the groove of the stud, and at the other end, with a portion of greater width than the studded member, to form a finger-hold on both sides of the member when the hook is in engagement with the stud, and a tongue and slot connection between the studded member and that end of the lever opposite the hook for locking the lever releasably in connection with the link, from which it may be disengaged by raising the finger-hold portion.

In testimony whereof I have signed my name to this specification, in the presence of two subscribing witnesses, on this 6th day of March, A. D. 1914.

ALVAH C. ROEBUCK.

Witnesses:
 L. E. HOUSHOLDER,
 J. B. SWAHTSTEDT.